March 22, 1960

W. L. BLATZ 2,929,954

ELECTRODE ASSEMBLIES AND METHODS OF MAKING

Filed Dec. 23, 1958

INVENTOR:
WALTER L. BLATZ,
BY *Philip L. Schlanp*
HIS ATTORNEY.

United States Patent Office 2,929,954
Patented Mar. 22, 1960

2,929,954

ELECTRODE ASSEMBLIES AND METHODS OF MAKING

Walter L. Blatz, Scotia, N.Y., assignor to General Electric Company, a corporation of New York Application December 23, 1958, Serial No. 782,575

11 Claims. (Cl. 313—357)

My invention relates generally to electrode and pertains more particularly to electrode assemblies adapted for use in pool-type electric discharge devices and methods of fabricating and mounting such assemblies.

Many pool-type electric discharge devices such, for example, as mercury pool ignitrons, include a high resistance ignitor or electrode which is generally immersed in the cathode pool for initiating and maintaining a cathode spot. In operation, such ignitrons and the support means generally provided therefor are subject to substantially high temperatures and wide temperature changes. Heretofore, such ignitors have been formed of graphite and support assemblies therefor have been fabricated of metal. However, in high-power devices and especially upon electrical loading of such devices toward the upper limits of their ratings, such prior art types of support assemblies have frequently failed primarily due to the inability of the metal support members to withstand the effects of high temperatures. Additionally, due to thermal expansion differences between the ignitor material and metal support members, loosening of the ignitor in its support tended to occur resulting in poor electrical connections between these elements.

Accordingly, the primary object of my invention is to provide a new and improved ignitor assembly which is better adapted for use in high-power devices.

Another object of my invention is to provide a new and improved composite ignitor and support structure including graphite elements bonded together by a material which is compatible with the temperatures and cathode materials encountered in pool-type electric discharge devices.

Another object of my invention is to provide a new and improved method of making a conductive bond of low thermal resistance between graphite elements.

Another object of my invention is to provide a new and improved method of bonding graphite elements which is effective for affording a joint with a minimum of bond thickness.

Another object of my invention is to provide new and improved means and method of securing the graphite and metal elements of an ignitor assembly.

Another object of my invention is to provide a new and improved method of joining graphite elements which requires a minimum of preparation, no special atmosphere, enables utilization of currently generally available bonding equipment and materials and results in very low cost on a per assembly basis.

Further objects and advantages of my invention will become apparent as the following description proceeds and the features of novelty which characterize my invention will be pointed out with particularity in the claims annexed to and forming part of this specification.

In carrying out the objects of my invention I provide an ignitor assembly including a graphite ignitor shank and a graphite support arm therefor. The ignitor shank and support arm are joined by a boron carbide interface which I obtain by forming on these members mating surfaces adapted for effecting a substantially good contact therebetween, interposing a quantity of powdered elemental boron between the surfaces to be joined and heating the graphite elements while applying a pressure to hold the mating surfaces in contact. The graphite support arm is tightly fitted in a slotted metal support member; and the slotted support member is welded at the slot therein thereby to effect tightening or constrictive strains in the metal member for enhancing and maintaining the tight fit of the graphite support arm therein.

For a better understanding of my invention reference may be had to the accompanying drawing wherein.

Figure 1:
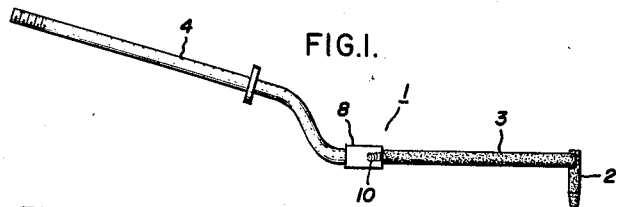
Figure 1 is an elevational view of an ignitor assembly constructed in accordance with one embodiment of my invention.

Referring to the drawing, there is shown in Figure 1 an electrode assembly generally designated 1 and constructed in accordance with a preferred embodiment of my invention. The assembly 1 includes an ignitor shank 2, an ignitor support member 3, and an electrode support 4.

Figure 2:
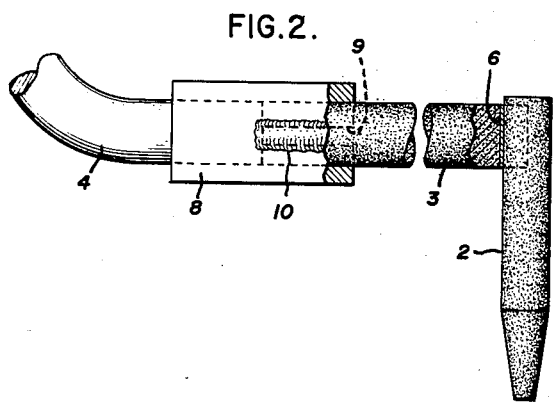
Figure 2 is an enlarged fragmentary and partially broken away illustration of a portion of the structure illustrated in Figure 1.
Figure 3:
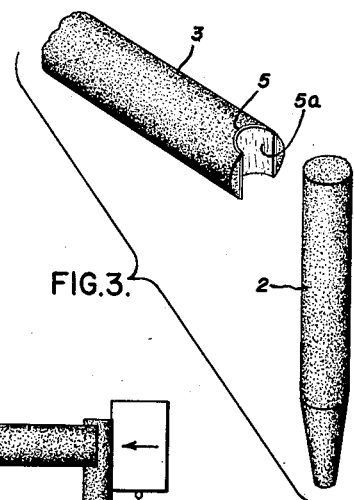
Figure 3 is an enlarged fragmentary perspective illustration of the elements employed in obtaining the structure of Figures 1 and 2.

As seen in Figures 1 to 3, the ignitor shank 2 is cylindrical and rod-like in construction and is tapered or pointed at its lower end. Additionally, the ignitor shank 2 is formed of graphite in accordance with common practice in the pool-tube art. The upper end of the shank 2 is positioned in a generally semi-cylindrical recess 5 formed in the transverse end surface of the support member 3 which is also formed of graphite. As best seen in Figure 2, the ignitor shank 2 and the support member 3 are joined or bonded together by means of a thin interface or interposed material designated 6.

The interface 6 comprises boron carbide and while substantially thin, is united to the contiguous surface portions of both the recessed end of the member 3 and the corresponding surface of the ignitor shank 2. The joint between the graphite members including the boron carbide interface 6 is physically strong and is also compatible in the electrode assembly in that it is satisfactorily electrically conductive and of low thermal resistance. Thus, a physical and electrical connection is provided between the ignitron and its support which is secure and not subject to loosening and resultant discontinuities. Additionally, the low thermal resistance of the joint enhances heat dissipation from the ignitor through the support member.

Preferably, I obtain the desired joint by machining or otherwise smoothing the mating surfaces of the recess 5 in the member 3 and the corresponding area on the side of the ignitor shank 2, thus to provide a high degree of contact therebetween. Care is taken to prevent contamination of the parts and particularly the mating surfaces with oil or other foreign matter. Additionally, the mating surfaces are cleaned of loose particles such as those resulting from the smoothing or machine operation. Thereafter, I place a paste-like quantity of powdered elemental boron 5a between the surfaces to be joined and clamp the members 2 and 3 in a manner such as that illustrated, for example, in Figure 4, and so as to apply a pressure of approximately 50 pounds per square inch normal to the surfaces of the joint. While maintaining this pressure, the clamped assembly is heated in air to a temperature between approximately 1700° centigrade and approximately 2000° centigrade for about one minute. Thus, the boron reacts with the graphite to form the boron carbide interface 6 which unites with the graphite members to provide the bond therebetween.

Figure 4:
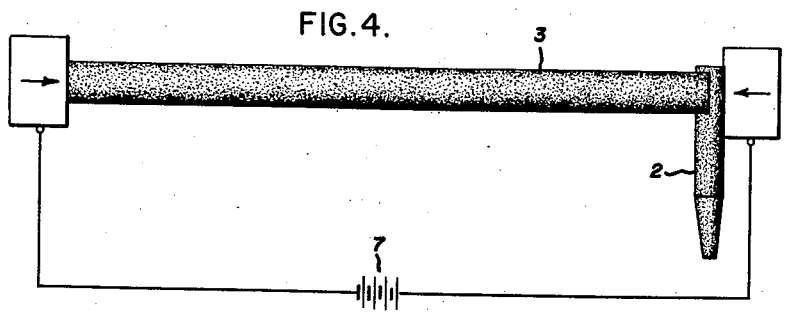
Figure 4 is a somewhat schematic illustration of the method employed in obtaining the structure of Figures 1 and 2.

As seen in Figure 4, the heating step can advantageously be accomplished by passing an electrical current from a source generally designated 7 through the clamped assembly comprising the ignitor shank 2 and graphite support 3. In this manner the high resistance ignitor and support member effectively generate the heat required in the process. Alternatively, the clamped assembly can be heated in a furnace.

With the graphite ignitor and support member satisfactorily joined in the manner described above to provide a composite graphite electrode assembly, it becomes necessary to provide means for mounting such assembly in an electric discharge device. This I accomplish by securing the end of the member 3 opposite the shank in a metal support member which can advantageously be steel and which, in turn, is adapted for being suitably mounted as from a wall of the device. In order to provide a secure mounting of the composite graphite electrode assembly, I provide a metal support member or collar-like member 8 into which is tightly fitted the end of the graphite support member 3. The member 8 is suitably secured as by welding to the end of the metal support 4 and is slotted at its open end at a plurality of diametrically opposed points as with saw cuts 9. This enables the segments of the member 8 to be spread slightly to accommodate the end of the graphite member 3 and thus enable a very tight fit. Subsequently, I weld the edges of the saw cuts or slots 9 in the manner shown at 10 in Figures 1 and 2. This secures the segments of the collar-like member 8 and draws the edges of the slots together or, in other words, introduces into the collar-like member constrictive strains which have the desirable effect of enhancing and maintaining the tight fit of the graphite member 3 in the collar-like member 8. I have found this manner of securing the graphite assembly to the metal support member 4 effective for insuring a continuing grip or hold on the graphite electrode assembly even under heat cycling where otherwise there would be a tendency for clearance to result between the metal and graphite members because of the differential expansions between steel and graphite.

Figure 6:
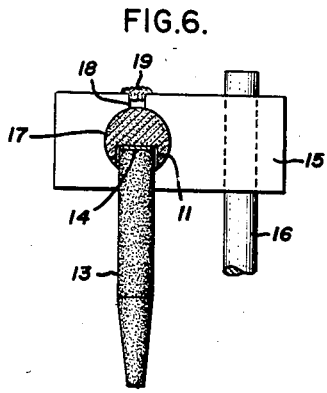
Figure 6 is a sectional view taken along the lines 6—6 in Figure 5.
Figure 5:
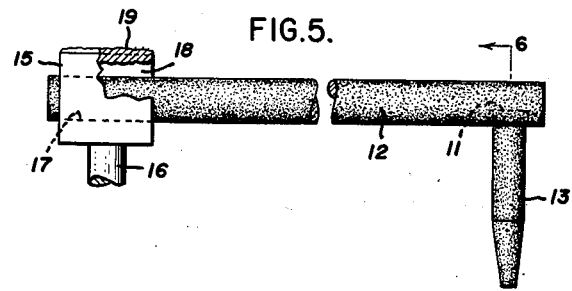
Figure 5 is a fragmentary partially broken away elevational view of a modified form of my invention.

Illustrated in Figures 5 and 6 is a modified form of my invention. In this form a flat bottomed recess or hole 11 is drilled into a lateral surface at one end of an elongated graphite support member 12. The hole is filled with powdered elemental boron and then assembled into the hole is a flat end of a graphite ignitor shank 13 which is slightly smaller in diameter than the hole. Subsequently while a pressure of approximately 50 pounds per square inch is being applied to the assembly and normal to the transverse end of the ignitor shank and bottom of the recess, the assembly is heated for approximately one minute to a temperature of from approximately 1700° C. to approximately 2000° C. Thus, a boron carbide interface 14 is formed which effectively bonds the graphite elements in an electrically and thermally conductive manner. For some purposes the time and pressure employed in making the bond does not appear critical; but I have found the 1 minute duration and 50 pounds pressure per square inch particularly effective in obtaining a bond effective for withstanding the environmental conditions found in a mercury-pool tube.

In Figures 5 and 6 there is also illustrated a modified structure for mounting the composite graphite electrode assembly. In this arrangement there is provided a steel block 15 fitted over and welded to a steel support post 16. The block 15 is collar-like in construction in that it is formed with an aperture 17 receiving the end of the graphite support rod 12 opposite the shank 13. The block 15 is slotted or saw cut at 18 and I effectively secure the member 12 in the block 15 by first tightly fitting these members and then welding the edges of the slot 18 together at 19 and in the manner illustrated, thus to hold the segments of the block together and to effect a drawing of the segments together or a constrictive strain in the block for enhancing and maintaining the tight fit of the graphite rod 12 therein.

If desired, the graphite electrode assembly of Figures 5 and 6 can alternatively be mounted in a device using the type of metal support means shown in Figures 1 and 2 and, conversely, the graphite electrode assembly of Figures 1 to 4 can be mounted by means of the metal support structure of Figures 5 and 6.

It will be seen from the foregoing that I have provided a composite graphite ignitor assembly which because of the graphite construction of both the ignitor shank and support therefor is better adapted for withstanding the high temperatures incidental to the operation of high-power pool-type electric discharge devices than would an assembly including a shank supporting member which is less refractory than graphite. Additionally, the elimination of metal means connected directly to and supporting the ignitor shank avoids possible adverse effects such as loosening of the shank and poor electrical and thermal connections to the shank and thus insures greater reliability and longer ignitor life.

Further, my composite graphite electrode assembly including the boron carbide interface is particularly adapted for use in mercury pool tubes wherein I have found the boron carbide interface and, thus, the assembly, as a whole, compatible with or capable of withstanding for long operational lives the environmental conditions of extreme heat and chemical reactivity generally encountered in mercury pool tubes.

While I have shown and described specific embodiments of my invention, I do not desire my invention to be limited to the particular forms shown and described, and I intend by the appended claims to cover all modifications within the spirit and scope of my invention.

What I claim as new and desire to secure by Letters Patent of the United States is:

1. A composite electrode assembly comprising a graphite ignitor shank, a graphite support member for said ignitor shank, said ignitor shank and support member having opposed mating surfaces, and a boron carbide interface between and united to said surfaces and providing a mechanically strong and electrically conductive joint of low thermal resistance between said shank and support member.

2. A composite electrode assembly comprising an elongated graphite support member having a semi-cylindrical recess in one end thereof, a cylindrical graphite ignitor shank positioned in said recess in said support member, and a boron carbide interface between and united to the surface of said recess in said support member and the corresponding lateral surface of said shank and providing a mechanically strong and electrically conductive joint of low thermal resistance between said support member and shank.

3. A composite electrode assembly comprising an elongated graphite support member having a recess in the lateral surface thereof, a graphite ignitor shank having an end positioned in said recess in said support member, and a boron carbide interface between and united to the bottom surface of said recess and the transverse end surface of said ignitor shank in said recess and providing a mechanically strong and electrically conductive joint of low thermal resistance between said support member and shank.

4. The method of bonding a plurality of graphite elements comprising the steps of interposing a quantity of powdered elemental boron between said elements to be joined, holding said elements in engagement under pressure and heating said elements until said boron reacts with said graphite to form a boron carbide interface united to the surfaces of both said elements for thereby joining said elements.

4. The method of bonding a plurality of graphite elements according to claim 4 wherein the heating is accomplished by passing an electrical current through said elements.

6. The method of making a composite graphite electrode assembly comprising the steps of forming a graphite ignitor and a graphite support member with opposing mating surfaces, interposing a quantity of powdered elemental boron between said mating surfaces, holding and mating surfaces together with said boron therebetween with a pressure of approximately 50 pounds per square inch and concurrently heating said assembly in air to a temperature of from approximately 1700° C. to approximately 2000° C. for approximately one minute.

7. An electrode assembly comprising a graphite ignitor shank, a graphite support member for said ignitor shank, said shank and support member having opposing mating surfaces, a boron carbide interface between and uniting said surfaces to join said shank and support member, the opposite end of said support member being tightly fitted in a slotted metal support member, said metal support member being welded at the slot therein whereby constrictive strains introduced in said metal member by said weld are effective for maintaining the tight fit of said graphite support member in said metal member.

8. In an electrode assembly, a first member carrying a collar-like member having at least one slot therein, a second support member tightly fitted in said collar-like member, and a weld across the slot in said collar-like member effective for introducing interenal constrictive strains in said collar-like member for maintaining the tight fit between said members.

9. The method of tightly joining a pair of elements comprising the steps of securing a collar-like metal member on one of said elements, cutting at least one longitudinal slot in said collar-like member, tightly fitting the second element in the slotted end of said collar-like member, and welding across the slot for joining the edge portions of the slot and introducing into said collar-like member interenal constrictive strains for enhancing and maintaining the tight fit of said second element therein.

10. In an article of manufacture, a substantially pure graphite member and a layer of boron carbide tightly adherent to a surface portion of said graphite member.

11. The method comprising providing a smooth surface on a substantially pure graphite member, applying a quantity of powdered elemental boron to said surface, and heating said member and applied powder until said boron reacts with said graphite to provide a tightly adherent layer of boron carbide on said graphite member.

References Cited in the file of this patent

UNITED STATES PATENTS

| | | |
|---|---|---|
| 2,093,390 | Wyckoff | Sept. 14, 1937 |
| 2,159,770 | Rowe | May 23, 1939 |